(12) United States Patent
Kvist et al.

(10) Patent No.: US 10,807,316 B2
(45) Date of Patent: Oct. 20, 2020

(54) ADAPTOR FOR SECURING OBJECTS TO EACH OTHER

(71) Applicant: MultiMaterial-Welding AG, Stansstad (CH)

(72) Inventors: Joakim Kvist, Nidau (CH); Philipp Bernhard, Thun (CH); Martin Sigrist, Bern (CH); Laurent Torriani, Lamboing (CH); Mario Weiss, Diessbach bei Büren (CH); Hannes Merz, Olten (CH); Antonino Lanci, Bern (CH); Samuel Malzach, Evilard (CH)

(73) Assignee: MULTIMATERIAL-WELDING AG, Stansstad (CH)

(*) Notice: Subject to any disclaimer, the term of this patent is extended or adjusted under 35 U.S.C. 154(b) by 164 days.

(21) Appl. No.: 15/942,722

(22) Filed: Apr. 2, 2018

(65) Prior Publication Data

US 2018/0281298 A1 Oct. 4, 2018

(30) Foreign Application Priority Data

Apr. 4, 2017 (CH) .......................... 447/17

(51) Int. Cl.
*B29C 65/56* (2006.01)
*F16B 5/08* (2006.01)
(Continued)

(52) U.S. Cl.
CPC ............ *B29C 65/562* (2013.01); *B29C 65/08* (2013.01); *B29C 66/30321* (2013.01);
(Continued)

(58) Field of Classification Search
CPC ..... B29C 65/562; B29C 65/08; B29C 66/742; B29C 66/30325; B29C 66/30341;
(Continued)

(56) References Cited

U.S. PATENT DOCUMENTS 5,106,225 A * 4/1992 Andre .................. F16B 5/0233
403/297
5,895,189 A 4/1999 Ruckert
(Continued)

FOREIGN PATENT DOCUMENTS

DE 10 2013 001 943 3/2014
EP 2 667 042 11/2013
(Continued)

OTHER PUBLICATIONS

Switzerland Search Report dated Aug. 22, 2017, Application No. 4472017, 2 pages.

*Primary Examiner* — Michael N Orlando
*Assistant Examiner* — Christopher W Raimund
(74) *Attorney, Agent, or Firm* — Rankin, Hill & Clark LLP

(57) ABSTRACT

An adaptor for securing a second object includes an anchoring part and an adjustment part, wherein the anchoring part includes a distally facing anchoring surface and a proximally facing first control surface. The adjustment part has a distally facing second control surface positioned to abut against the first control surface. The anchoring part and the adjustment part define a common axis that is not perpendicular to the z direction, wherein the first control surface and possibly also the second control surface is/are helical with respect to the axis. Thereby a relative z position of the adjustment part with respect to the anchoring part is defined by the relative orientation of the adjustment part with respect to the common axis while the second control surface abuts against the first control surface.

12 Claims, 1 Drawing Sheet

(51) Int. Cl.
  *B29C 65/08*  (2006.01)
  *B29C 65/00*  (2006.01)
  *B32B 15/08*  (2006.01)
  *B32B 7/08*   (2019.01)
  *F16B 5/02*   (2006.01)
  *F16B 43/00*  (2006.01)
  *F16B 5/04*   (2006.01)

(52) U.S. Cl.
  CPC .. *B29C 66/30325* (2013.01); *B29C 66/30341* (2013.01); *B29C 66/742* (2013.01); *B32B 7/08* (2013.01); *B32B 15/08* (2013.01); *F16B 5/0233* (2013.01); *F16B 5/08* (2013.01); *F16B 5/045* (2013.01); *F16B 43/009* (2013.01)

(58) Field of Classification Search
  CPC ..... B29C 66/30321; B32B 15/08; B32B 7/08; F16B 5/0233; F16B 5/08; F16B 43/009; F16B 5/045
  See application file for complete search history.

(56) References Cited

U.S. PATENT DOCUMENTS

2002/0176738 A1* 11/2002 Kluting ................ F16B 5/0233
                                                  403/292
2007/0270820 A1* 11/2007 Dickinson .......... A61B 17/7007
                                                  606/279
2018/0304543 A1* 10/2018 Mayer .................. B29C 65/564

FOREIGN PATENT DOCUMENTS

WO    2017/055548    4/2017
WO    2017/162693    9/2017

* cited by examiner

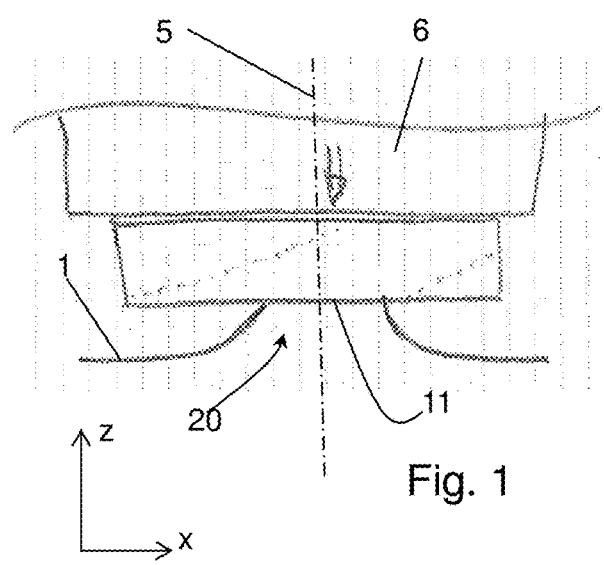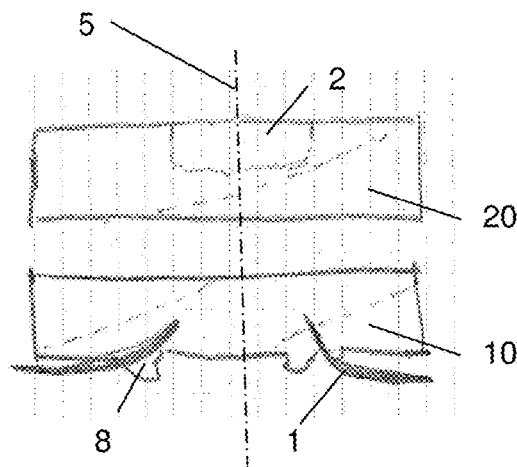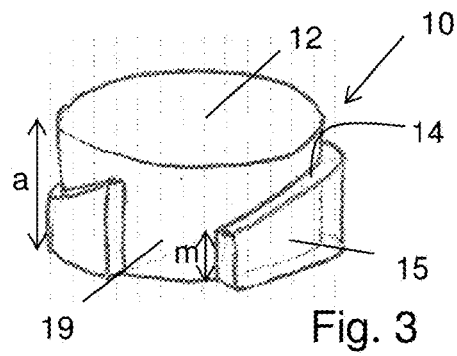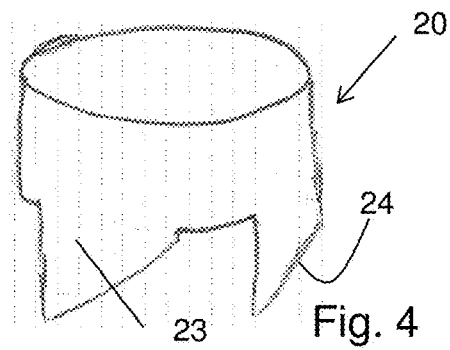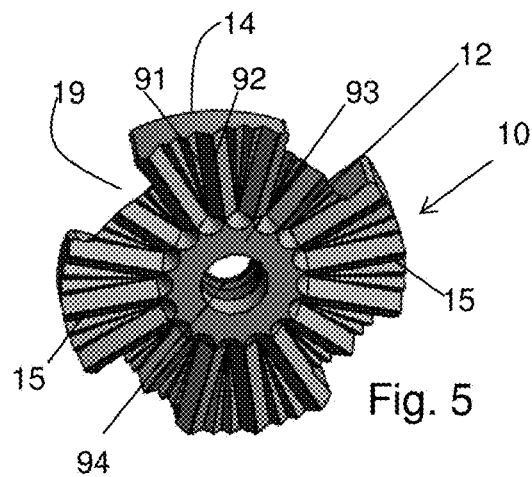

ADAPTOR FOR SECURING OBJECTS TO EACH OTHER

BACKGROUND OF THE INVENTION

Field of the Invention

The invention is in the fields of mechanical engineering and construction, especially mechanical construction, for example automotive engineering, aircraft construction, railway industry, shipbuilding, machine construction, toy construction, building industries, etc. In particular, it relates to devices and methods for—mechanically—fastening objects to each other in a defined position.

Description of Related Art

In the automotive, aviation and other industries, there has been a tendency to move away from steel-only constructions and to use lightweight material such as aluminum or magnesium metal sheets or polymers, such as carbon fiber reinforced polymers or glass fiber reinforced polymers or polymers without reinforcement, for example polyesters, polycarbonates, etc. instead.

The new materials cause new challenges in bonding elements of these materials—especially in bonding flattish object to an other object. An example for this is the bonding of parts of polymer-based material to metal parts, such as metal sheets.

A particular challenge when bonding elements to each other is the compensation of tolerances. In such bonds, a precise definition of the elements with respect to each other, and often also of the position of the fastener may be required. Such precise definition may especially be hard to reach if a manufacturing process has to be particularly economical and/or if the parts to be connected are comparably large in at least one dimension and/or react to the conditions they are subject to during manufacturing and use in a different manner (for example if they have different coefficients of thermal expansion).

SUMMARY OF THE INVENTION

It is an object of the present invention to provide an adaptor part and a fastening method overcoming drawbacks of prior art devices and methods and especially being suited for tolerance compensation, for example for z tolerance compensation, where the z direction may be defined to be the direction perpendicular to a surface to which the fastened element is attached.

In accordance with the invention, an adaptor for securing a second object to a first object is provided. The adaptor includes an anchoring part and an adjustment part, wherein the anchoring part includes a distally facing anchoring surface and a proximally facing first control surface. The adjustment part has a distally facing second control surface positioned to abut against the first control surface. The anchoring part and the adjustment part define a common axis that is not perpendicular to the z direction (but for example parallel to it), wherein the first control surface and possibly also the second control surface is/are helical with respect to the axis. Thereby a relative z position of the adjustment part with respect to the anchoring part is defined by the relative orientation of the adjustment part with respect to the common axis while the second control surface abuts against the first control surface. This can be used to adjust the z position of the adjustment part relative to the first object, in connection with the orientation of the adjustment part being defined and possibly fixed by the function of the adaptor/the adjustment part.

According to an aspect of the invention, the anchoring part includes an anchoring part body and a plurality of discrete first control surface protrusions protruding radially from the anchoring part body, wherein the first control surface is formed as proximally facing surface of the control surface protrusions. The control surface protrusions are discrete in that the periphery of the anchoring part body has portions without the control surface protrusion, whereby a radial outer contour of the anchoring part is not circular.

According to another aspect of the invention, the first control surface is formed as proximally facing surface of control surface protrusions. Because of the helical shape of the first control surface, an axial extension of the control surface protrusions is not constant along the circumference of the anchoring part body but increases/decreases gradually as a function of the azimuthal angle. The first control surface in each section extends between a distal end where the axial extension of the respective control surface protrusion is at a minimum and a proximal end where the axial extension of the control surface protrusion is at a maximum, and the axial extension of the control surface protrusions at the distal end is not zero but corresponds to at least 15% or at least 20% of the axial extension of the axial extension at the proximal end.

According to an even further aspect, the first control surface is formed by a proximally facing lane running on a helical path along the periphery of the anchoring part, wherein the lane has a plurality of discrete lane portions with interruptions between them, wherein a radial extension of the anchoring part at the locations of the interruptions is smaller than a radial extension of the anchoring part at the locations of the lane portions. For example, in a projection along the axis, an outer contour of the anchoring part is not circular but has interruptions between the portions of the lane.

In any embodiment, the shapes of the anchoring part and of the adjustment part may be adjusted to each other so that the adjustment part may be brought into contact with the anchoring part by an essentially axial movement without any twisting movement being necessary to bring the control surfaces into physical contact with each other.

The control surface lane portions/the control surface protrusions may be of approximately equal length and/or be equally distributed around the periphery. The anchoring part may especially include two, three, four, five or six of these control surface lane portions/control surface protrusions.

The anchoring part may be adapted to be anchored with respect to a first in a method that includes embedding an edge of the first object into thermoplastic material of the anchoring part. To this end, the anchoring part may include thermoplastic material in a solid state at least at the anchoring surface and the first object may have a generally flat portion with an edge. Anchoring the anchoring part with respect to the first object may then include the steps of:
  bringing the edge in contact with the anchoring surface,
  while the edge is in contact with the thermoplastic material, coupling mechanical vibration energy into the assembly (that includes the anchoring part and the first object; especially coupling the energy into the anchoring part) until a flow portion of the thermoplastic material due to friction heat generated between the edge and the thermoplastic material becomes flowable and flows around the edge to at least partially embed the edge in the thermoplastic material, and stopping the mechanical vibration and causing the thermoplastic material to re-solidify, whereby the re-solidified thermoplastic material at least partially embedding the edge anchors the anchoring part in the first object.

The adaptor according to aspects of the invention for use in a method that includes coupling mechanical vibration energy into the anchoring part has the following advantage: At positions where the portion of the anchoring part that has the (first) control surface is very thin (at positions towards a distal end of a section of the control surface), then during the anchoring process high vibratory distortions may occur at these positions because the bending stiffness at these locations is low, especially if the anchoring surface is structured for optimization of the anchoring process (see below). Therefore, if the helical control surface extended all around the anchoring part, then the thickness of the anchoring part as a whole would have to be chosen such that at the places of minimal axial extension this axial extension is still substantial or the stability during the anchoring process would be too low. Due to the approach according to aspects of the invention with the discrete portions and the interruptions between them, the minimal axial extension of the radial protrusions may be kept at a required minimum while the overall anchoring part does not need to be overly thick.

The anchoring part may include a distal anchoring surface specifically adapted to this process. In embodiments, the anchoring surface that includes the thermoplastic material may be structured. The fact that the contact side is structured means that it is different from just being flat and even and that it includes protrusions/indentations. For example, it may include a pattern of ridges and grooves, for example a regular pattern.

It has been found that a structured contact side may have the effect of reducing the energy and force inputs required until the edge has penetrated into thermoplastic material of the first object to a sufficient depth. Especially, this required input may be reduced by more than just a proportionality factor corresponding to the portion of unfilled volumes of indentations. This may be attributed to additional flow channels being generated by the structure.

In an embodiment, the structure forms a pattern of radially extending ridges/grooves.

Specifically, in an embodiment the structure forms a pattern of radially extending ridges/grooves that extend to the periphery, i.e. the grooves are open towards the side.

In addition to the radially extending ridges/grooves, the anchoring surface may include a central flat region. The central flat region may, during the anchoring process, remain within the opening in the first object along which the edge extends.

The adjustment part may be equipped to fasten a second object to it, whereby the adaptor is capable of securing such second object relative to the first object. To this end, the adjustment part may include a suitable engagement structure for mechanically securing a second object to the adjustment part. Alternatively, it may contain the second object or be integral with it. Due to the helical control surface, a relative z position of the first and second objects may be adjusted by choosing the appropriate orientation of the first and second objects relative to each other with respect to rotations about the common axis.

In all embodiments, the control surface protrusion may have a smooth radially outer surface or may be structured.

The invention also concerns a fastening method, the method including the steps of providing an adaptor of the kind disclosed and claimed in this text, and anchoring the anchoring part relative to the first object, especially by the method described in this text, and bringing the anchoring part and the adjustment part together in a desired relative orientation, with the control surfaces abutting against each other. In this, the adjustment part may be equipped to be secured to a second object and the method may accordingly include the further step of securing the adjustment part to the second object (prior to bringing the adjustment part and the anchoring part together or thereafter or possibly simultaneously).

The step of securing the adjustment part to the anchoring part may include bringing the adjustment part and the anchoring part together by a substantially axial movement, without any substantial rotation.

Generally, as an option for all embodiments, the helical shape of the first and/or second control surface (if both control surfaces are helical, the helix angles of the helixes may correspond to each other) may be continuous or stepped. If the helix shape is stepped adjustment of the z position is incremental, whereas it is continuously possible if the helix shape is continuous.

The first object instead of being an object that has a sheet portion (for example by the first object being a metal sheet) may also have any other shape. In an example, the first object is a lightweight building element, and anchoring the anchoring part may include using an approach as for example described in PCT/EP2017/056734.

The generally flat portion may be a metal sheet portion. Alternatively, it may be any other portion defining an edge, for example manufactured by a casting method. In embodiments, for example, this portion may be manufactured by die casting of aluminum/an aluminum alloy or of a magnesium/a magnesium alloy. Alternatively, this portion may be of a plastic material, for example a thermoplastic material with a substantially higher liquefaction temperature than the thermoplastic material of the anchoring part and/or having a high content of a filler, such as a fiber filler. Also if the generally flat portion is of such plastic material, it may be manufactured by a casting/molding method.

The generally flat portion may define a plane in a vicinity of the location where the anchoring part is attached, but with a section of the generally flat portion projecting away from the plane towards the proximal direction. The plane may define the x-y plane to which the z direction is perpendicular. In embodiments in which the first object and the second object each have a plurality of fastening locations, the fastening location may define a median plane, which plane in these embodiments may alternatively define the x-y-plane.

In accordance with a further possibility, the z direction may be defined to be the direction along which a relative force between the anchoring part and the first object is applied when the anchoring part is anchored with respect to the first object. Such relative force may be a pressing force applied together with coupling the mechanical vibration into the anchoring par, a pressing force applied while an adhesive is hardened, a pressing force applied by a state-of-the art fastener that anchors the anchoring part, etc.

In this text, the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. In special embodiments, the thermoplastic material therefore may even include a thermoplastic elastomer.

Thermoplastic materials are well-known in the automotive and aviation industry. For the purpose of the method according to the present invention, especially thermoplastic materials known for applications in these industries may be used.

A thermoplastic material suitable for embodiments of the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than that of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibers or particles of material that have no thermoplastic properties or has thermoplastic properties including a melting temperature range that is considerably higher than the melting temperature range of the basic polymer.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention that include applying mechanical vibration has preferably a frequency between 2 and 200 kHz (even more preferably between 10 and 100 kHz, or between 20 and 40 kHz) and a vibration energy of 0.2 to 20 W per square millimeter of active surface.

In many embodiments, especially embodiments that include coupling the vibration into the anchoring part, the vibrating tool (e.g. sonotrode) is e.g. designed such that its contact face oscillates predominantly in the direction of the tool axis (the proximodistal axis, corresponding to the axis along which the first object and second objects are moved relative to one another by the effect of the energy input and pressing force when the edge is caused to penetrate into material of the first object; longitudinal vibration) and with an amplitude of between 1 and 100 µm, preferably around 30 to 60 µm. Such preferred vibration is e.g. produced by ultrasonic devices as e.g. known from ultrasonic welding.

Depending on the application, a vibration power (more specifically: the electrical power by which an ultrasonic transducer is powered) may be at least 100 W, at least 200 W, at least 300 W, at least 500 W, at least 1000 W or at least 2000 W.

In this text, the terms "proximal" and "distal" are used to refer to directions and locations, namely "proximal" is the side from which an operator or machine applies the mechanical vibration, whereas distal is the opposite side.

BRIEF DESCRIPTION OF THE DRAWINGS

In the following, ways to carry out the invention and embodiments are described referring to drawings. The drawings are all schematical in nature. In the drawings, same reference numerals refer to same or analogous elements. The drawings show:

FIG. 1 schematically, in vertical section, an arrangement of an anchoring part, a first object and a sonotrode;

FIG. 2 schematically, the anchoring part of FIG. 1 anchored with respect to the first object and together with the adjustment part;

FIGS. 3 and 4 are views of an embodiment of an anchoring part and an adjustment part, respectively; and FIG. 5 a view of an embodiment of an anchoring part.

DESCRIPTION OF THE PREFERRED EMBODIMENTS

FIG. 1 illustrates, in section, an anchoring part 10 with a metal sheet being an example of a first object 1. The metal sheet includes an opening 20, for example made by a punching tool, and around the opening the metal sheet is deformed to be bent away from a metal sheet plane towards proximally (upwardly in FIG. 1). The deformed section thus in the embodiment of FIG. 1 forms a collar around the perforation. Around the perforation, the metal sheet moreover forms an edge that in the anchoring step has the function of an energy director.

The anchoring part 10 includes thermoplastic material. In the depicted embodiment, the anchoring part is illustrated to consist of the thermoplastic material. It defines a distally facing anchoring surface 11 that for anchoring is brought into contact with the deformed section of the first object 1.

The method of anchoring the anchoring part relative to the first object corresponds to the method taught in PCT/EP2016/073422. For anchoring the anchoring part 10 with respect to the first object 1, a vibrating sonotrode 6 presses the anchoring part 10 against the first object 1 in a vicinity of the opening. Mechanical vibration energy thereby coupled into the anchoring part 10 propagates via the anchoring part 10 and is absorbed at the places where the anchoring part is in contact with the edge that thereby serves as an energy director. As a consequence, the thermoplastic material around the edge is heated and becomes flowable, allowing the deformed section of the sheet material to be pressed into the body of the anchoring part.

After re-solidification, this leads to an anchoring of the anchoring part with respect to the first object and thereby to a mechanical positive-fit connection between the anchoring part and the second object.

FIG. 2 schematically illustrates the assembly with the first object 1 and the anchoring part 10 after the anchoring process. Parts of a flow portion 8 of the thermoplastic material have flown to underneath the first object and thereby cause the mentioned anchoring.

FIG. 2 also illustrates the adjustment part 20. The adjustment part 20 can be brought into different angular positions relative to the anchoring part with respect to the common axis 5 of the anchoring part and the adjustment part, whereby a z position is adjustable.

The adjustment part may be equipped to fasten a second object relative to the first object 1. To this end, it may include a suitable engagement structure for mechanically securing a second object to the adjustment part. Alternatively, it may contain the second object 2 or be integral with it, as schematically shown in FIG. 2.

FIG. 3 schematically shows an embodiment of an anchoring part, again consisting of thermoplastic material. The anchoring part has an anchoring part body 12 and a plurality of control surface protrusions 15 protruding radially therefrom. The proximal surface of these control surface protrusions 15 form the control surface 14. The control surface runs helical, i.e. it forms a plurality of discrete lanes having a constant radial position and a monotonous linear dependency of the axial (z-) position on the azimuthal angle.

The control surface is accessible from proximally, it forms part of the proximal-most surface.

The control surface protrusions are discrete and interrupted by interruptions 19 where the radial extension of the anchoring part 10 is less than the radius of the control surface. A minimum axial extension m of the control surface protrusion 15 is substantial and corresponds for example to at least 20% of the axial extension a of the anchoring part 10.

Also the extension in circumferential direction of the interruptions is substantial, the interruptions may for example extend along at least 20% of the periphery of the anchoring part body.

The adjustment part 20 as shown in FIG. 4 includes second control surface protrusions 23 the distal end surface of which forms the second control surface 24. Also the second control surface runs helically, and the corresponding lanes have the same radial position and the same helix angle as the first control surface protrusions. Thereby, the adjustment part 20 may be brought into engagement by an axial movement with the adjustment part (it may be slipped onto the adjustment part from 'above' (from proximally) without any rotation being necessary) in different relative orientations, leading to different z positions.

The anchoring part and the adjustment part may include means for being secured to each other when engaging with each other (not shown in FIGS. 3 and 4).

FIG. 5 shows an anchoring part 10. The distal surface (anchoring surface 11) is structured to form a pattern of protrusions and indentations. In the depicted embodiment, the structure of the anchoring surface is such as to form a pattern of radial ridges and grooves. Thereby, two effects may be achieved:
- in addition to the material saving by the interruptions 19, further material is taken away.
- The flow portion of the thermoplastic material that flows relative to the first object during the process has a space to flow to.

The shape with the grooves and ridges has turned out to be beneficial during manufacturing by molding, especially injection molding.

The depth of the grooves may, for example, correspond to between 10% and 50% of the penetration depth of the first deformed section into the thermoplastic material of the anchoring part.

The grooves preferably extend to the periphery, i.e. are open towards laterally.

In a central region, in the depicted embodiment the anchoring surface has an optional full section 93 that during the anchoring process is always within the opening 20. Thus, the maximal tolerance in the x-y-plane is less than the difference between the radius of the opening and the radius of the full section 93.

The anchoring portion 10 in the example shown in FIG. 5 also has a central through opening 94 with an inner thread, for example for a screw to engage, which screw could serve as means for securing the anchoring part and the adjustment part to each other.

A further, optional, feature of the embodiment of FIG. 5, which feature is independent of the other features of this embodiment, is that the axial extension of the control surface protrusions 15 (the embodiment of FIG. 5 has four such protrusions equally distributed around the periphery) at the end where it is at a maximum corresponds to the axial extension of the whole anchoring part 10, i.e. the anchoring part body does not necessarily proximally protrude above the control surface protrusions. The thickness of the anchoring part may thereby be minimized.

What is claimed is:

1. An adaptor for securing a second object to a first object, the adaptor comprising an anchoring part and an adjustment part,
wherein the anchoring part comprises a distally facing anchoring surface and a proximally facing first control surface,
wherein the adjustment part has a distally facing second control surface positioned to abut against the first control surface,
wherein the anchoring part and the adjustment part define a common axis, wherein at least the first control surface is helical with respect to the axis, whereby a relative z position of the adjustment part with respect to the anchoring part is defined by the relative orientation of the adjustment part with respect to the common axis while the second control surface abuts against the first control surface, and
wherein the first control surface is formed by a proximally facing lane running on a helical path along the periphery of the anchoring part,
wherein the adjustment part is shaped to be brought into contact with the anchoring part by an essentially axial movement to bring the first and second control surfaces into physical contact with each other,
wherein the lane has a plurality of discrete lane portions with interruptions between them, wherein a radial extension of the anchoring part at the locations of the interruptions is smaller than a radial extension of the anchoring part at the locations of the lane portions,
wherein the lane portions have an equal average axial position,
wherein the second control surface is helical with respect to the axis, with a same helix angle as the first control surface and with a same distance to the axis as the first control surface, and wherein the anchoring part comprises thermoplastic material at least at the anchoring surface.

2. The adaptor according to claim 1, wherein the control surface lane portions are of equal length.

3. The adaptor according to claim 1, wherein the control surface lane portions are equally distributed around the periphery.

4. The adaptor according to claim 1, wherein the anchoring surface is structured.

5. The adaptor according to claim 4, wherein the anchoring surface comprises a pattern of ridges and grooves.

6. The adaptor according to claim 5 wherein the ridges and grooves run radially.

7. The adaptor according to claim 6, wherein the ridges and grooves extend to a periphery of the anchoring part.

8. The adaptor according to claim 5, wherein the anchoring surface comprises a central flat section.

9. The adaptor according to claim 1, wherein:
the adjustment part includes a main body and a control surface protrusion extending axially from a distal end of the main body; and
a distal surface of the control surface protrusion defines the second control surface.

10. The adaptor according to claim 8, wherein the anchoring part includes a through opening extending axially from the central flat section to the first control surface.

11. A method of securing a second object to a first object, wherein the first object comprises an edge, the method comprising:
providing an adaptor, the adaptor comprising an anchoring part and an adjustment part
wherein the anchoring part comprises a distally facing anchoring surface with thermoplastic material at least at the anchoring surface, and a proximally facing first control surface,
wherein the adjustment part has a distally facing second control surface positioned to abut against the first control surface,
wherein the anchoring part and the adjustment part define a common axis, wherein at least the first control surface is helical with respect to the axis, whereby a relative z position of the adjustment part with respect to the anchoring part is defined by the relative orientation of the adjustment part with respect to the common axis while the second control surface abuts against the first control surface,
wherein the first control surface is formed by a proximally facing lane running on a helical path along the periphery of the anchoring part, wherein the lane has a plurality of discrete lane portions with interruptions between them, wherein a radial extension of the anchoring part at the locations of the interruptions is smaller than a radial extension of the anchoring part at the locations of the lane portions,
bringing the edge in contact with the anchoring surface,
while the edge is in contact with the thermoplastic material, coupling mechanical vibration energy into the anchoring part until a flow portion of the thermoplastic material due to friction heat generated between the edge and the thermoplastic material becomes flowable and flows around the edge to at least partially embed the edge in the thermoplastic material,
stopping the mechanical vibration and causing the thermoplastic material to re-solidify, whereby the re-solidified thermoplastic material at least partially embedding the edge anchors the anchoring part in the first object, and
securing the adjustment part to the anchoring part,
wherein the method comprises the further step of securing the second object to the adjustment part or wherein the second object is contained in the adjustment part or integral with the adjustment part.

12. The method according to claim 11, wherein:
the adjustment part is shaped to be brought into contact with the anchoring part by an essentially axial movement to bring the first and second control surfaces into physical contact with each other,
the second control surface is helical with respect to the axis, with a same helix angle as the first control surface and with a same distance to the axis as the first control surface, and
wherein the control surface lane portions have an equal average axial position.

* * * * *